(12) United States Patent
Jalkanen

(10) Patent No.: US 6,453,745 B1
(45) Date of Patent: *Sep. 24, 2002

(54) SENSOR DEVICE FOR THE 3-DIMENSIONAL MEASUREMENT OF AN ATTITUDE OR ACCELERATION

(75) Inventor: Erkki Jalkanen, Somerniemi (FI)

(73) Assignee: Georesearch Engineering E. Jalkanen & Co. (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 09/202,550
(22) PCT Filed: Jun. 19, 1997
(86) PCT No.: PCT/FI97/00396
  § 371 (c)(1),
  (2), (4) Date: Dec. 16, 1998
(87) PCT Pub. No.: WO97/48986
  PCT Pub. Date: Dec. 24, 1997

(30) Foreign Application Priority Data

Jun. 20, 1996 (FI) ................................... 962576

(51) Int. Cl.⁷ ............................................. G01P 15/08
(52) U.S. Cl. ................................. 73/514.09; 33/366.15
(58) Field of Search ....................... 73/514.09, 514.05, 73/514.08, 514.11, 382 R, 382 G; 33/366.15, 366.18, 366.19, 366.21; 310/329

(56) References Cited

U.S. PATENT DOCUMENTS

| | | | |
|---|---|---|---|
| 2,728,868 A | * 12/1955 | Peterson | 73/514.09 |
| 3,084,557 A | * 4/1963 | Von Ahlefeldt | 73/514.09 |
| 3,270,565 A | * 9/1966 | Hawley et al. | 73/514.09 |
| 3,461,730 A | 8/1969 | Peters | 73/514.09 |
| 3,706,217 A | 12/1972 | Slater et al. | 73/514.09 |
| 3,742,767 A | 7/1973 | Bernard et al. | 73/514.18 |
| 3,992,951 A | 11/1976 | Erspamer et al. | 73/514.09 |
| 4,255,976 A | 3/1981 | Formato | 73/861.08 |
| 4,395,908 A | * 8/1983 | Shopland | 73/514.09 |
| 4,613,752 A | * 9/1986 | Davis | 73/514.09 |
| 4,648,273 A | * 3/1987 | Ozols | 73/382 R |
| 4,671,113 A | * 6/1987 | Carome | 73/514.09 |
| 4,791,617 A | * 12/1988 | Seymour | 310/329 |
| 5,046,056 A | 9/1991 | Sallas et al. | |
| 5,126,980 A | 6/1992 | Sallas et al. | |
| 6,276,206 B1 | 8/2001 | Reime | 73/514.09 |

FOREIGN PATENT DOCUMENTS

| | | |
|---|---|---|
| DE | 2812775 | 9/1979 |
| DE | 2844646 | 4/1980 |
| EP | 0566130 | 10/1993 |

* cited by examiner

Primary Examiner—John E. Chapman
(74) Attorney, Agent, or Firm—Ostrolenk, Faber, Gerb & Soffen, LLP

(57) ABSTRACT

The invention relates to a sensor device for measuring attitude, acceleration or gravitational field and its gradient components. The device includes a spherical cavity (3) which contains a sensor substance in the form of a fluid or some other inertial material having fluidic properties. The cavity (3) is provided with measuring sensors or measuring electrodes (−x, +x; −y, +y; −z, +z) for three different coordinate axes x, y, z, all of said sensors responding to said common inertial mass which fills the cavity (3). Such assembled single compact measuring device can be used for determining any of the said quantities 3-dimensionally.

7 Claims, 3 Drawing Sheets

SENSOR DEVICE FOR THE 3-DIMENSIONAL MEASUREMENT OF AN ATTITUDE OR ACCELERATION

BACKGROUND OF THE INVENTION

The present invention relates to a sensor device for measuring an attitude, acceleration or gravitational field and its gradient components, said device including a spherical cavity which contains a sensor substance in the form of a fluid or some other inertial material having fluidic properties.

An accelerometer provided with a spherical cavity is previously known e.g. from U.S. Pat. No. 3,461,730. This prior known device produces an absolute acceleration value regardless of direction. Unlike this, a device of the invention can be used for sensing an acceleration as a vector quantity. The prior known device also does not include any indications for identifying the attitude of the device, while one of the fundamental features of the present invention is the identification of an attitude of the device.

As for the prior art, reference can also be made to publications U.S. Pat. No. 3,992,951 and EP Publication 0566130. The latter relates to a sensor for rotational motion, describing the principles of sensor elements or transducers which can be applied also in the present invention. In other words, the sensors may comprise piezoelectric transducers, capacitive membrane sensors and elongation strip sensors. Other types of sensors or transducers can also be used, as described in more detail hereinafter.

SUMMARY OF THE INVENTION

An object of the invention is to provide a sensor device, capable of determining the attitude of the device or the rate and direction of its acceleration 3-dimensionally. In other words, the sensor device must have an equal directionality in all directions to make it capable of sensing an acceleration vector, in addition to which the device also serves as an attitude identifier.

This object is achieved by means of the invention.

Some of the application areas for a sensor device of the invention are e.g. as follows:

in industrial manufacturing and robotics as attitude identifier or a triaxial sensor for linear motion (acceleration)

in navigation systems (inertial navigation) in land vehicles, water- and aircraft, in various self-controlled or self-navigated mobile devices in so-called black boxes of vehicles (when the kinetic history of a vehicle is to be recorded)

in geophysics, geotechnique and in other areas of construction engineering e.g. as a triaxial vibration transducer, as an attitude sensor in drill holes, as a motion/attitude sensor for equipment towed by survey vessels, and as a sensor for gravitational field measuring equipment.

BRIEF DESCRIPTION OF THE DRAWING

The invention will now be described in more detail with reference made to the accompanying drawings, in which FIG. 1. shows a spherical cavity in a measuring sensor with its 3-D coordinate axes.

DESCRIPTION OF A PREFERRED EMBODIMENT

Figure 1:
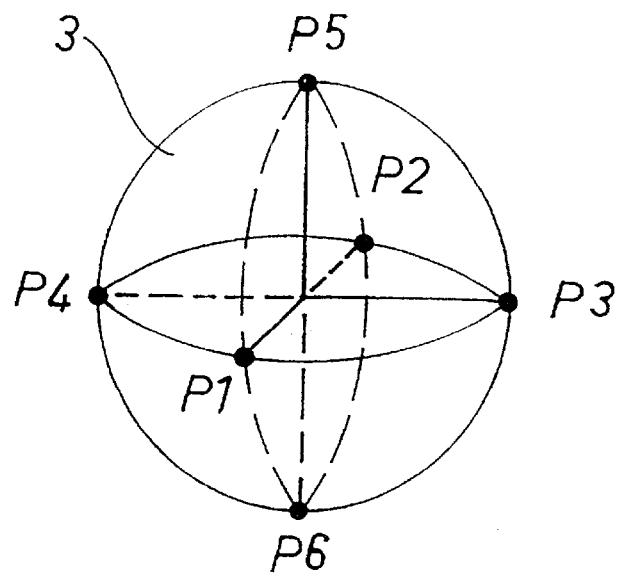
Figure 2:
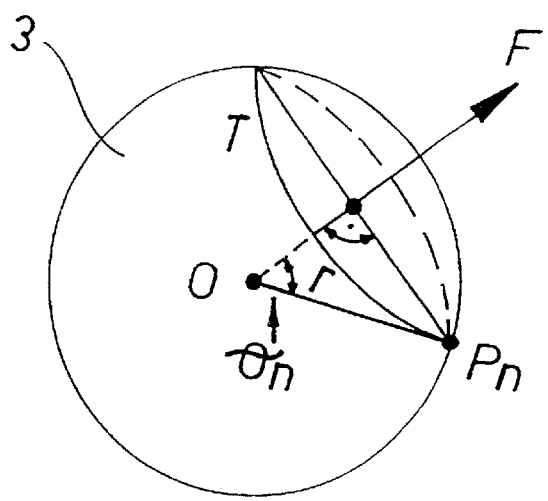
FIG. 2 shows the same cavity, having its inertial fluid subjected to the action of a vector force $\overline{F}$.

First explained is the theoretical background of the invention with reference to FIGS. 1 and 2. In the arrangement of FIG. 1, a spherical container 3 contains a fluid at a pressure Po. The container 3 is provided with imaginary rectangular coordinates x, y, z, whose positive axial directions intersect the spherical surface at points $p_1$, $p_3$ and $p_5$ and negative axial directions at points $p_2$, $p_4$ and $p_6$, respectively.

At least the points P are provided with sensors (measuring sensors or electrodes), which sample some material property of the sensor fluid as a function of the fluid pressure.

If a body, which contains the fluid container 3, travels at an acceleration $\overline{F}$, the fluid within the container, as a result of inertia, develops a pressure whose magnitude at its maximum is $$p = 2\gamma|\overline{F}|r \qquad (1)$$

wherein $\gamma$=fluid density and r=container radius.

This pressure is 0 at the point where the direction of an acceleration vector extending through the center of the spherical surface intersects said spherical surface and the maximum pressure value according to formula (1) is found at the intersection of the opposite vector direction and the spherical surface.

If T is a normal plane for the vector $\overline{F}$, extending through a point $p_n$ (n=1 . . . 6), it can be concluded on the basis of FIG. 2 that:

the distance between the plane T and the center of the spherical surface is $\overline{F}° \cdot (\overrightarrow{OP_n})$
$= \overline{F}° \cdot r\overline{q}_n°$
$= r (\overline{F}° \cdot \overline{q}_n°) = r\cos\theta_n$ the distance of the plane T from a point, at which the inertia-induced fluid pressure=0, is $r(1-\cos\theta_n)$ at the point $p_n$ prevails a pressure $p_n = \gamma r(1 - \cos\theta_n)F$ pressure $p_n+1 = \gamma r(1+\cos\theta_n)F$ since $\cos(\theta+\pi) = -\cos\theta$ In the above formulae and in FIG. 2

$OP_n = r\overline{q}_n°$ r=radius $\overline{q}_n°$=unit vector $\overline{F}°$=unit vector in the direction of $\overline{F}$ $\theta_n$=intervectorial angle If, according to the starting premise, the fluid is further thought to have a pressure $p_o$, the points $P_n$ and $P_n+1$ can be measured to have pressures $(p_n+p_o)$ and $(p_{n+1}+p_o)$.

When $\Delta p_n = (p_n+p_o)-(p_{n+1}+p_o) = p_n-p_{n+1} = 2\gamma rF \cos\theta_n$ $\Delta p_1 = p_1-p_2 = 2\gamma Fr \cos\theta_1$ $\Delta p_2 = p_3-p_4 = 2\gamma Fr \cos\theta_2$ $$\Delta p_3 = p_5 - p_6 = 2\gamma Fr \cos\theta_3 \quad (2)$$

On the basis of this $$(\Delta p_1)^2 + (\Delta p_2)^2 + (\Delta p_3)^2 = (2\gamma Fr)^2 (\cos^2\theta_1 + \cos^2\theta_2 + \cos^2\theta_3)$$

which has a consequence that $$F = \frac{1}{2\gamma r}\sqrt{(\Delta p_1)^2 + (\Delta p_2)^2 + (\Delta p_3)^2}$$

$$\cos\theta_1 = \Delta p_1[(\Delta p_1)^2 + (\Delta p_2)^2 + (\Delta p_3)^2]^{-\frac{1}{2}}$$
$$\cos\theta_2 = \Delta p_2[(\Delta p_1)^2 + (\Delta p_2)^2 + (\Delta p_3)^2]^{-\frac{1}{2}}$$
$$\cos\theta_3 = \Delta p_3[(\Delta p_1)^2 + (\Delta p_2)^2 + (\Delta p_3)^2]^{-\frac{1}{2}} \quad (3)$$

the rate and direction of the acceleration vector $\overline{F}$ relative to the system axes is thus determined. In the simplest case, the relationship between a signal and pressure to be measured at points $p_n$ is linear. Signal=k×pressure.

$$S = k \times p,$$

whereby $$p_n = 1/k_{S_n}$$

and $$F = \frac{1}{2\gamma rk}\sqrt{(\Delta S_1)^2 + (\Delta S_2)^2 + (\Delta S_3)^2}$$

$$\cos\theta_1 = \Delta S_1[(\Delta S_1)^2 + (\Delta S_2)^2 + (\Delta S_3)^2]^{-\frac{1}{2}}$$
$$\cos\theta_2 = \Delta S_2[(\Delta S_1)^2 + (\Delta S_2)^2 + (\Delta S_3)^2]^{-\frac{1}{2}}$$
$$\cos\theta_3 = \Delta S_3[(\Delta S_1)^2 + (\Delta S_3)^2]^{-\frac{1}{2}} \quad (4)$$

In cases other than the simple relationships shown in the above formulae, the pressure is determined in each case according to individual measuring points and then by applying the formulae according to equation groups (2) and (3).

In order to determine the pressure from measured signals, it is possible to use a computer or other microprocessor-controlled calculating circuits.

Figure 4:
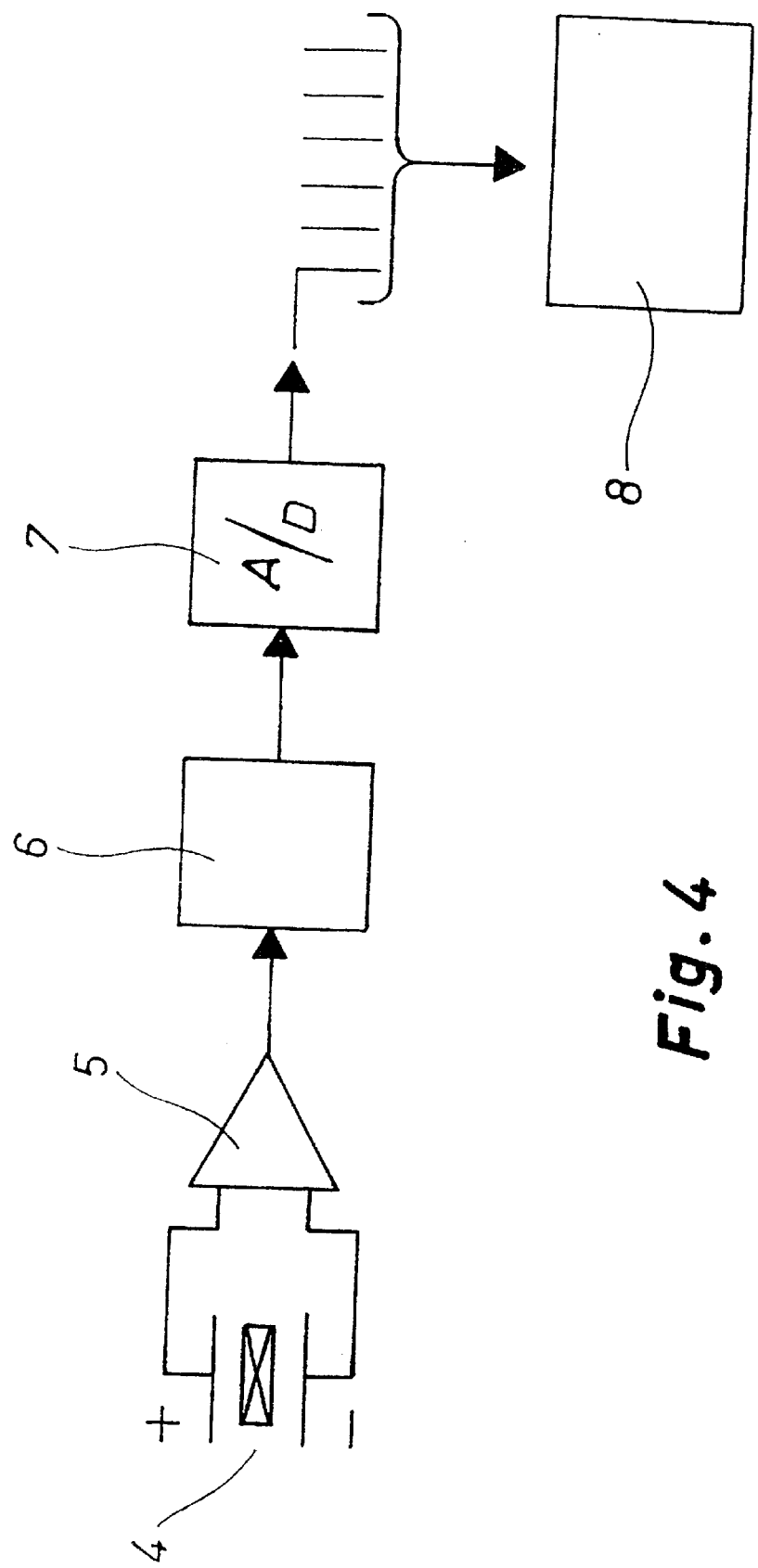
FIG. 4 is a block diagram, showing an example of a measuring circuit design for a sensor device.

FIG. 4 depicts one example of a measuring circuit design in the case of a passive sensor. A piezo sensor 4 or other pressure responsive sensor is placed at a measuring point $P_n$. A preamplifier 5 amplifies a sensor signal, which is fed by way of a signal adapter 6 to an A/D converter 7. The digital signals received from various sensors are fed to a computer 8, which performs the necessary calculations in accordance with the above formulae.

Figure 3:
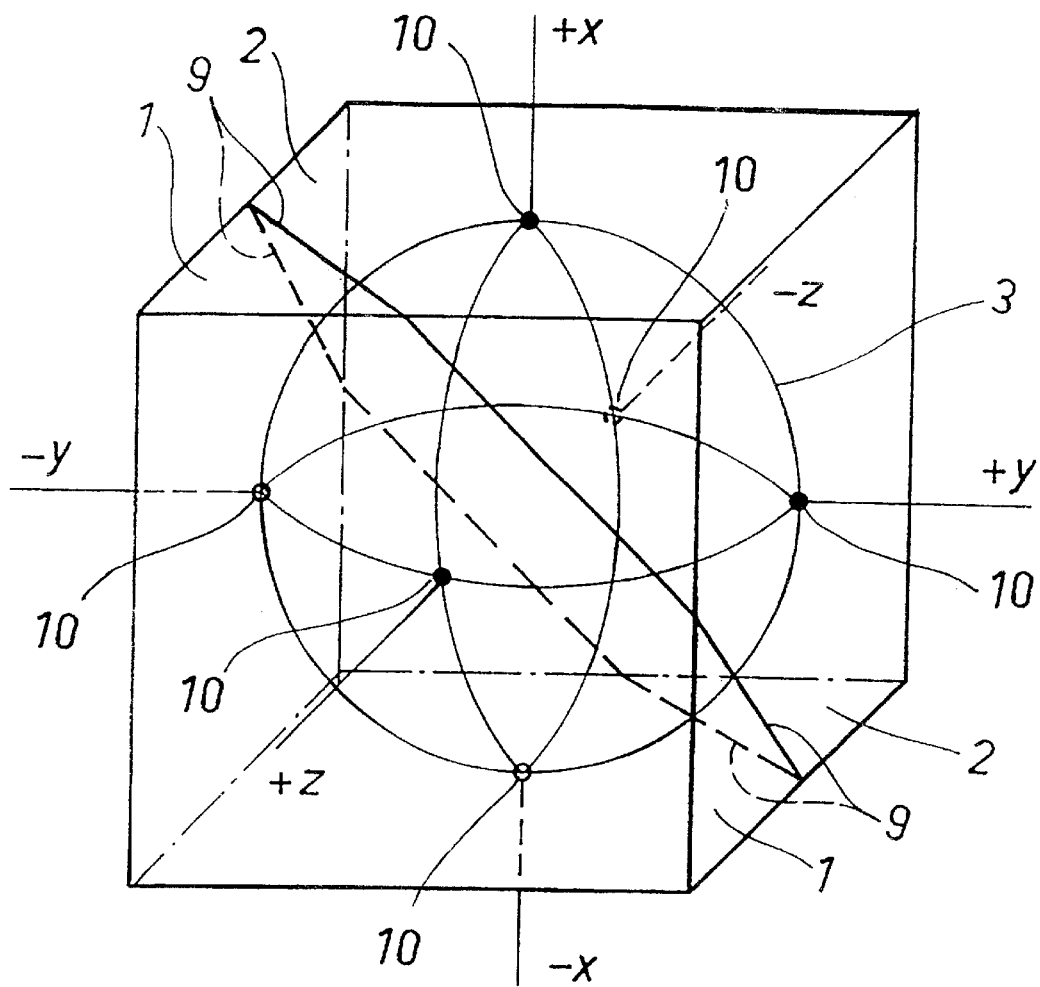
FIG. 3 shows one structural design for a sensor unit in a sensor device of the invention according to one exemplary embodiment.

FIG. 3 illustrates a sensor unit which comprises a cubic-shaped body, which is assembled from separate pieces 1, 2 on the opposite sides of a division plane 9 with the halves of a spherical cavity 3 machined and the sensors 10 fitted therein prior to joining the cubic halves together.

The sensor material filling the cavity 3 comprises a fluid, liquid or gas or some other substance with fluidic properties, such as gels or colloids. If the sensor fluid to be used is electrically or optically neutral relative to pressure, the pressure is measured directly by means of a sensor (passive or active) integrated in the system. An essential feature in the invention is that the sensor fluid is common to all sensors performing 3-dimensional measuring. The sensors may respond to changes in the pressure of a sensor fluid, e.g. with one of the following results:

a change in the charge or potential of a piezocrystal or plastics included in a sensor element a capacitance change in a capacitive sensor element a change in the dimensions of a cavity resonator or resonance cavity of a wave tube.

Sensor substances, which have electrical or optical responses as a result of pressure existing in the substance, may respond to pressure variations caused by acceleration, e.g. with one of the following results:

dielectric polarization (changes in an intra-substance electric field)

a change in electric conductivity (piezoresistivity)

a change in optical properties piezoelectricity.

When using this type of sensor substances, the sensor substance within the cavity may be an integral part of measuring sensors. For example, the electrodes on the surface of a cavity are adapted to measure changes occurring in the sensor substance.

A sensor device of the invention is characterized in that the construction measuring 3-dimensionally its attitude or acceleration has been created as a compact unit having a high degree of integration. At the moment, such an achievement requires the arrangement of three separate sensor devices whose assemblage involves both mechanical problems and problems relating to the processing of results. These problems have been resolved by means of a sensor device of the invention.

The sensor device is capable of measuring the attitude of its base which is at rest or in constant motion. In case the sensor device is in accelerating motion and it is desirable to measure acceleration of the motion as a vector quantity, the gravitational acceleration and the attitude must be known or brought into the system from an external source. If it is desirable to measure an attitude while the sensor device is in accelerating motion, the acceleration of the motion must be known or brought into the system from external sources.

As is known, the pressure difference between two points in a fluid due to gravitational acceleration, is related to the gravitational potential difference between the same points.

Thus second order partial differentials of pressure are related to the tensor components of the gravitational field gradient.

This implies that the present invention can be used also for measuring all of the gradient components of the gravitational field, in case the pressure sensing locations are added as necessary.

What is claimed is:

1. A sensor device for measuring attitude, acceleration or gravitational field and the gradient components of gravitational field, the device comprising:

the sensor device having a spherical cavity defined by an interior with a spherical surface;

at least three measuring sensors at the spherical surface of the interior, the sensors being located at three mutually independent x, y and z coordinate axes, all of the sensors being responsive to a common sensor substance; and the common sensor substance being in the form of a fluid inertial material having fluidic properties, wherein the volume of the sensor substance is related to the volume of the spherical cavity so that the sensor substance completely fills the cavity, the sensor substance is responsive to change of pressure caused by acceleration which produces changes in the distribution of characteristic material properties of the sensor substance, and those characteristic material properties are at least one of piezoelectricity, piezoresistivity, dielectric polarization and optical properties, and wherein the sensors are adapted to measure a physical quantity caused by those changes.

2. The sensor of claim 1, wherein the coordinate axes extend through the center of the cavity and are mutually perpendicular, the measuring sensors being at the inner surface of the cavity.

3. The sensor device of claim 1, wherein the sensor substance exhibits fluidic properties and is selected from the group consisting of liquid, gel or colloid.

4. The sensor device of claim 1, wherein the sensors are capacitive sensor elements that respond by capacitance change among the sensors due to a change in the dielectric properties of the sensor substance.

5. The sensor device of claim 1, wherein the sensor substance is piezoelectric or piezoresistive, or such that the dielectric properties of the sensor substance are pressure dependent.

6. The sensor device of claim 1, wherein the response to be measured is one of an optical quantity or an electrical quantity.

7. A sensor device for measuring attitude, acceleration or gravitational field and the gradient components of gravitational field, the device comprising:

the sensor device having a spherical cavity defined by an interior with a spherical surface;

at least three measuring sensors at the spherical surface of the interior, the sensors being located at three mutually independent x, y and z coordinate axes, all of the sensors being responsive to a common sensor substance; and a common sensor substance in the form of a fluid inertial material having fluidic properties, wherein the volume of the sensor substance is related to the volume of the spherical cavity so that the sensor substance completely fills the cavity, wherein the sensor substance is responsive to acceleration, and wherein the sensors are piezo sensor elements that respond to changes in the sensor substance by changing the potential or charge in the sensor elements.

* * * * *